July 26, 1966  M. L. MARKOWITZ  3,262,580
SLEWABLE GANTRY CRANE
Filed June 23, 1964 4 Sheets-Sheet 1
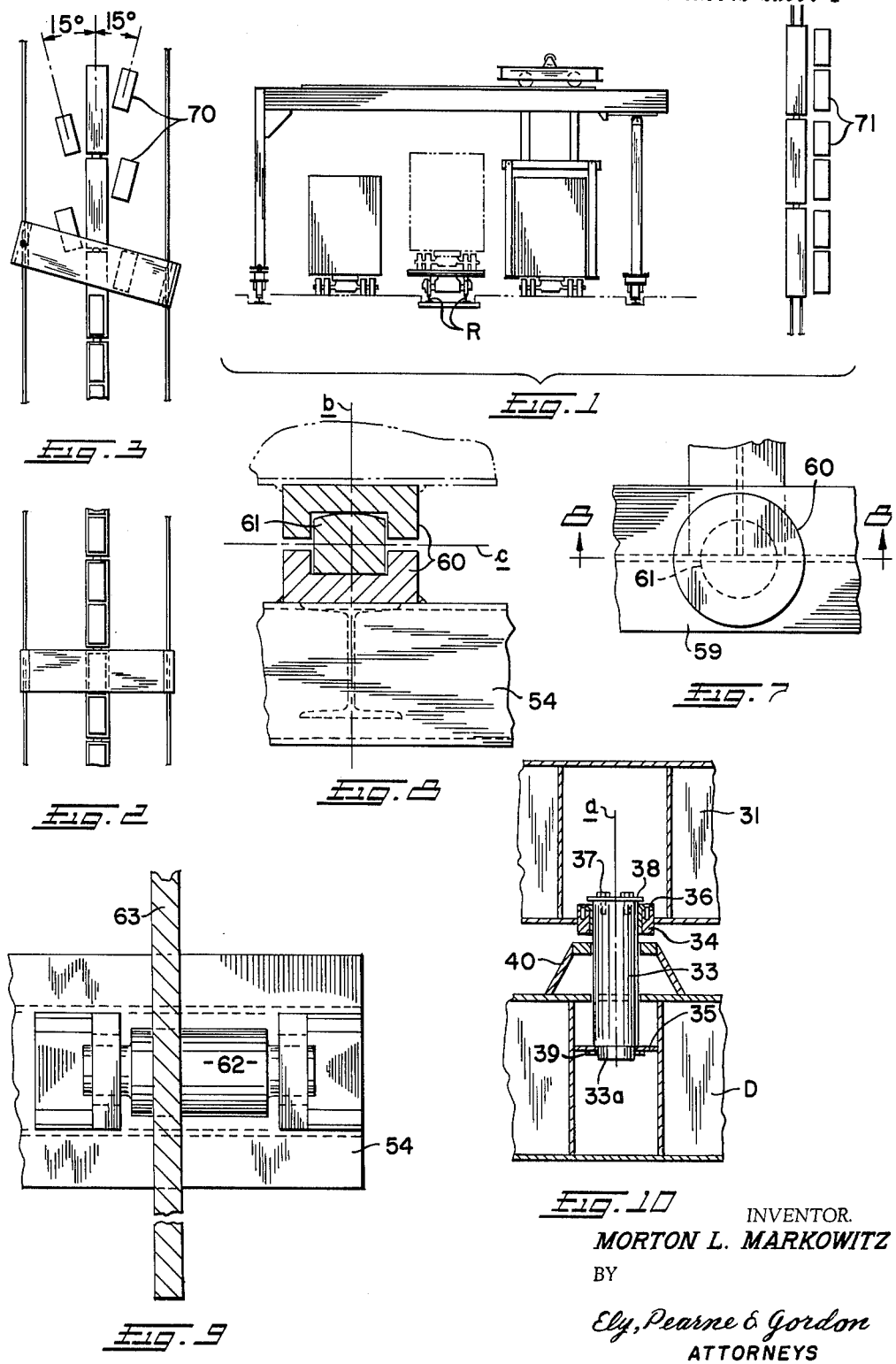
INVENTOR.
MORTON L. MARKOWITZ
BY
Ely, Pearne & Gordon
ATTORNEYS

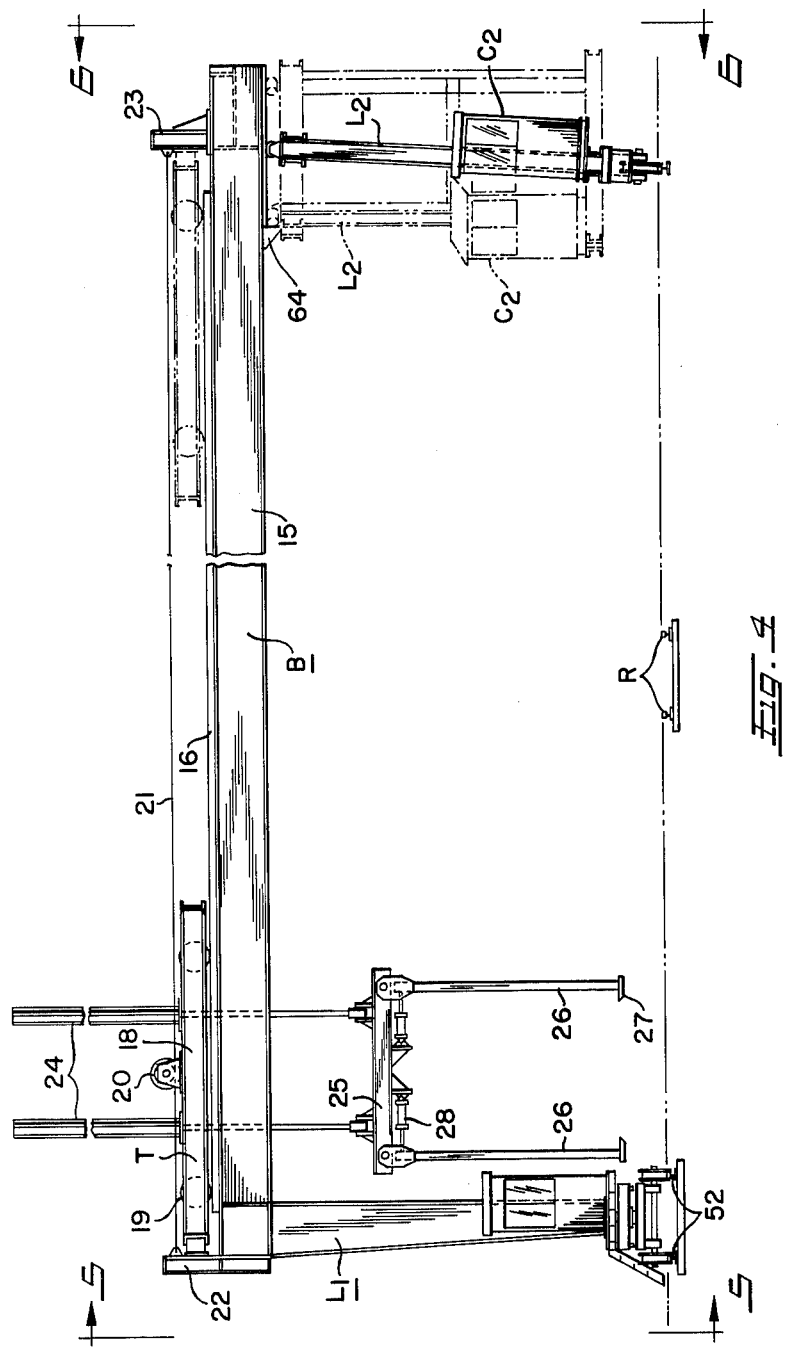
Fig. 4
INVENTOR.
MORTON L. MARKOWITZ
BY
ATTORNEYS

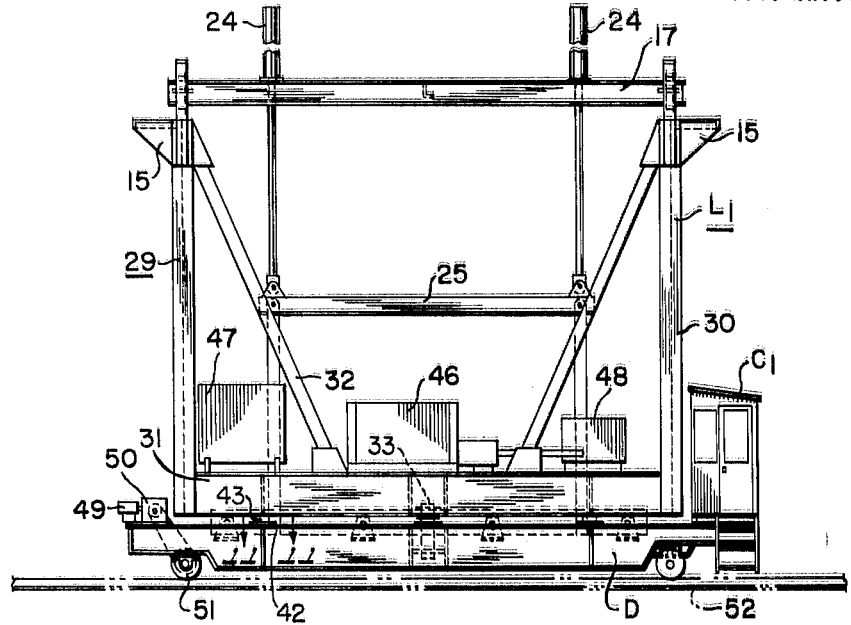
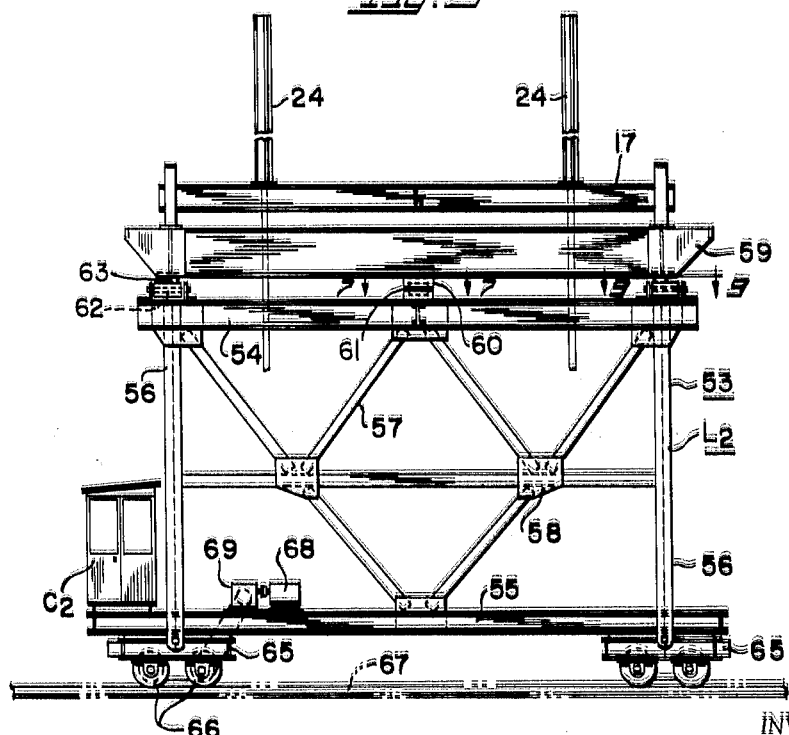

INVENTOR.
MORTON L. MARKOWITZ
BY
Ely, Pearne & Gordon
ATTORNEYS

United States Patent Office 3,262,580
Patented July 26, 1966

3,262,580
SLEWABLE GANTRY CRANE
Morton L. Markowitz, University Heights, Ohio, assignor to McDowell-Wellman Engineering Co., Cleveland, Ohio, a corporation of Ohio
Filed June 23, 1964, Ser. No. 377,182
11 Claims. (Cl. 212—6)

The present invention relates to a gantry crane for handling cargoes and the like and, more particularly, to such a crane adapted to load or unload cargoes with respect to their carriers, so that the cargoes may be lifted from or deposited in an acute angular position relative to the carrier.

It is often necessary to load or unload a string of carriers arranged end-to-end. A very common example of this is a series of railroad freight cars strung in line along a railroad track. Each car must be individually loaded and unloaded. Normally, the transfer takes place between a railroad freight car, and especially a flat car, and trucks nestled as close to the freight car as convenient and parked substantially in parallelism with the length of the railroad car. This system of transferring cargoes is very common in what has become to be popularly termed the "piggyback" transport of entire truck bodies minus the highway tractor.

While the length of a freight car is ample to carry one or more cargoes, such as a "piggyback" truck body, there is not sufficient room between adjacent bodies for the tractor cabs, whether the transfer is to entail a "piggyback" truck body or still other cargo, quickly to maneuver a cargo into the substantial parallelism with the freight car required prior to effecting an actual transfer. Not only considerable forward and backward motion is required of heavy-duty trucks, but such activity adjacent one freight car often makes it difficult if not impossible for another truck to work adjacent a companion freight car. Due to the underlying supporting tracks, it is not possible of course to orient the freight car itself.

The present invention solves the indicated problem by a gantry crane adapted to assume an acute angular position transversely of a freight car. As a result, upon lifting a load aside a freight car for ultimate deposition on the freight car, the load or cargo may initially lie at an acute angle with respect to the length or longitudinal axis of the car. When the crane unloads a freight car, the reverse is equally true, that is, the cargo is laid aside the freight car but in an acute angular position therewith. By use of the present crane, there is, accordingly, no difficulty for a tractor cab or the like readily reaching the cargo adjacent the freight car or, conversely, maneuvering the cargo to such a position by the side of a freight car. Moreover, several consecutive in-line freight cars can be simultaneously serviced in a like manner as is commonly desired.

It is, therefore, a principal object of the present invention to provide an improved gantry crane.

Another object is to provide a gantry crane maneuverable into an acute angular position transversely of a freight car in order to position cargoes and the like angularly at the side of the freight car, or to lift cargoes so positioned, thereby facilitating loading and unloading.

A further object is to provide such a maneuverable gantry crane adapted to load and unload a freight car or the like from an in-line series of the same with a minimum of interference from car-to-car.

Other objects and advantages will become apparent from the following drawings and description wherein:

FIGURE 1 is a semi-schematic, front elevational view of the general environment of a gantry crane adapted to load and unload railroad flat cars with respect to adjacent trucks, and includes a fragmentary plan view diagrammatically illustrating the substantial parallelism which normally must exist between flat cars and trucks in order to carry out a loading or unloading operation;

FIGURE 2 is a semi-diagrammatic, plan view of the present gantry crane disposed substantially at right angles over a series of carriers arranged end-to-end;

FIGURE 3 is a view similar to FIGURE 2 but illustrates the skewed or canted position of the present crane and the angular positions the cargoes may thus assume with respect to the in-line cars;

FIGURE 4 is a front elevational view of the present gantry crane with a pivoted or skewed position of the right hand leg shown in phantom;

FIGURE 5 is a left hand elevational view of FIGURE 4 on the line 5—5 with parts removed;

FIGURE 6 is a right hand elevational view of FIGURE 4 on the line 6—6 with parts removed;

FIGURE 7 is a partial section of FIGURE 6 on a line 7—7;

FIGURE 8 is a section of FIGURE 7 on the line 8—8;

FIGURE 9 is a partial section of FIGURE 6 on the line 9—9;

FIGURE 10 is an enlarged, fragmentary view of the pivotal means shown in FIGURE 5;

Figures 11, 12:
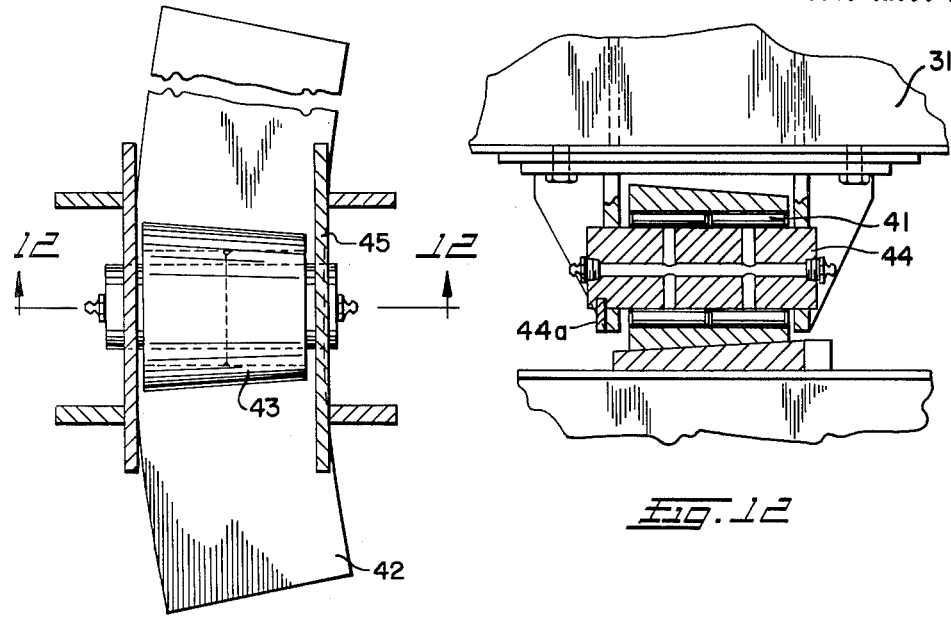
FIGURE 11 is a partial section of FIGURE 5 on the line 11—11.
FIGURE 12 is a section of FIGURE 11 on the line 12—12.

In general, the present gantry crane has a generally inverted U-shape construction comprising two leg members and an intermediate connecting bridge or bight member. One of the leg members is rigidly secured to the bridge member but rotatably mounted adjacent its free end. The other leg member is rotatably mounted at its juncture with the bridge member. For the bridge member to assume a skewed or angular position transversely of a freight car or the like, one of the leg members of the present crane moves relatively to the other and in a direction generally transverse to the bridge member, as along a supporting track. To accommodate this movement, the leg member fixed to the bridge pivots about its free end, while the other leg member pivots about its junction with the bridge member, simultaneously assuming a vertically canted position.

STRUCTURE

As indicated, the present crane comprises a generally inverted U-shape construction including (FIGURES 1 and 4) a bridge or bight member B, a side leg member $L_1$ rigidly fixed with respect to the bridge B, and a further side leg member $L_2$ pivotally joined to the bridge member B. For convenience of reference, each of these major parts is described individually.

Bridge member

Referring principally to FIGURES 4, 5 and 6, the bridge or bight portion B of the inverted U-shape gantry comprises two spaced, horizontally disposed beams 15, each carrying an overlying track 16. A trolley generally indicated at T rides from one end of the tracks 16 to the other. The trolley and its auxiliary equipment, including locomotive means, do not form a part of the present invention and may comprise any of those trolley structures known in the art for the present purpose. However, for purposes of illustration, the trolley may comprise a rectangular frame comprising cross beams 17 and side beams 18. Wheels 19 are conventionally journalled in the side beams 18 and ride the tracks 16. Driven winches 20 and engaging cables 21, strung between posts 22 and 23 over each of the main beams 15, may be used to move the trolley along the tracks.

Vertically disposed hydraulic cylinders 24 raise and lower by their piston rods a horizontally directed lifting frame 25 with respect to the trolley T. Lifting arms 26 are pivotally joined at their upper ends to the lifting frame 25 and have work-engaging shoes 27 at their lower ends. Hydraulic cylinders 28 fixed to the frame 25 pivot the arms 26 laterally so as to grip a cargo at its bottom edges by the shoes 27.

Rigidly mounted leg member

Referring principally to FIGURES 4, 5, 10, 11 and 12, the leg member $L_1$ which is rigidly secured to the bridge member B comprises a U-shape frame generally indicated at 29 having sides 30 fixed at the upper ends to the beams 15 and at the lower ends to an interconnecting platform 31. Suitable reinforcing braces 32 rigidify the structure. A dolly or carrier generally indicated at D underlies and pivotally connects to the platform 31 of the frame 29 through a king pin 33. As shown in FIGURE 10, the pin 33 extends vertically between a hub 34 and a crossplate 35 which are supported by the platform 31 and carrier D, respectively. A sleeve bushing 36 has an upper flange secured to the hub 34 and turns with the platform 31, the pin 33 being fixed. Bolts 37 secure a cap 38 to the pin 33 to keep out dirt. Lugs 39 welded to the crossplate 35 straddle a necked-down, slot portion 33a of the pin and prevent the latter's rotation. A side support 40 engages a medial portion of the pin 33.

In order to carry the overhead weight of the platform 31, arcuate tracks 42 concentric with the arc of rotation are fixed on opposite sides of the king pin 33 atop the dolly or carrier D. Tapered rollers 43 ride the tracks 42 and for this purpose are rotatably mounted by bearings 41 around a pin 44 held against rotation by a conventional keeper plate 44a and supported by flanges 45 fixed to the underside of the platform 31.

The platform 31 may carry suitable operating equipment for moving the trolley T on the tracks 16, operating the lifting frame 25 and arms 26, etc., such as a power unit 46 operated by diesel fuel in container 47 to pressurize hydraulic fluid in a system having a reservoir or surge chamber 48 for the hydraulic fluid. Such apparatus is well known in the art and is not, therefore, described in detail.

The dolly or carrier D has an operator's cab $C_1$ at one end and a suitable power unit 49 to drive, through a conventional gear reducer 50 and an accompanying sprocket and chain, one or more of four wheels 51 (FIGURES 4 and 5) which carry and move the entire structure indicated as leg member $L_1$. As illustrated in FIGURE 4, in order to spread the heavy weight of the entire apparatus at this end over a wider area, it is preferred to have at least dual tracks 52 undergirding the dolly D.

Pivotally mounted leg member

Referring principally to FIGURES 4, 6, 7, 8 and 9, the leg member $L_2$ which is pivotally mounted with respect to the bridge member B comprises a rectangular frame generally indicated at 53 (FIGURE 6) including spaced upper and lower beams 54 and 55, respectively, joined by vertical side columns 56. Braces 57 and gusset plates 58 reinforce the structure. An additional cross-beam 59 extends between the beams 15 of the bridge B and pivotally connects to the frame 53.

More particularly (FIGURES 7 and 8), the cross-beam 59 and upper beam 54 each have a circular socket 60 welded to a matching medial portion of the two beams. Ball means 61 seated within the sockets act as a pivot to enable the frame 53 and beam 59 to rotate and rock relatively to each other. As especially illustrated by FIGURE 8, the "ball means" as used herein need not be entirely spherically shaped as long as some surface portion makes a relatively small areal contact with one of the sockets 60 to provide a pivot point. Thus, the ball means 61 may actually be partially in the shape of a ball.

Suitable stabilizing means are provided to facilitate the pivotal action just described. For example, a roller 62 is pivotally mounted atop and adjacent each end of the upper beam 54 of the frame 53. A bar 63 against which a roller rides is mounted beneath each end of the beam 15. Each bar 63 has a stop 64 at its inner end. In this regard, it will be noted (FIGURE 4) that in the normal position of leg member $L_2$ (that is, in the absence of skewing) the rollers 62 engage the bars 63 intermediate their ends, so as to permit travel of the rollers along the bars in either direction as conditions may require. Also, leg member $L_2$ preferably has a slight inward lean to compensate somewhat for the anticipated skew when the bridge member B is swung in its horizontal plane as hereinafter more fully described.

The lower beam 55 of frame 53 may also take the form of a platform to provide room for an additional operator's cab $C_2$. The ends of the side columns 56 of the frame 53 are fixed to trucks 65, each of which has two in-line wheels 66 engaging a track 67. The lower beam 55 may also carry a suitable power unit 68 to drive, through a conventional gear reducer 69 and accompanying sprocket and chain, one or more of the wheels 66.

OPERATION

The present crane is described as used for transferring "piggyback" truck bodies with respect to a railroad flat car, although the crane is, of course, adapted for transferring many other types of cargoes.

In operation, power units 50 and 68 drive their respective wheels, so that the crane as a whole advances uniformly along the tracks 52 and 67. Assuming an unloading operation, the crane stops when the bridge member B (FIGURES 1 and 2) is disposed horizontally across a freight car and its cargo transversely thereof and substantially at right angles to the longitudinal axis of the car or cargo. The trolley T moves directly over the cargo, grips and lifts the cargo by engaging the arms 26 and shoes 27 along the bottom edges of the load, and then moves to either end of the bridge member B along the tracks 16.

At this juncture, the novel advantages of the present crane come into play. Leg member $L_1$ is moved relatively to leg member $L_2$ along their respective tracks. This may be accomplished by moving only one leg member while, if desired, braking the other leg member; or by moving each leg member in opposite directions. If the cargo is to be deposited on the left of conventional railroad tracks R, as viewed in FIGURE 3, leg member $L_2$ is placed rearwardly of leg member $L_1$.

During the relative linear movement between the two leg members, each undergoes a pivoting action, and in the case of leg member $L_2$ the action is complex. Leg member $L_1$ pivots about a vertical axis $a$ (FIGURE 10) which lies substantially in the plane of the frame 29, the frame pivoting in a clockwise direction as viewed in FIGURE 3, during this exemplary unloading operation. The tapered rollers 43 and cooperating tracks 42, of course, facilitate this rotation.

Simultaneously, leg member $L_2$ also undergoes pivoting but about a plurality of axes. One axis $b$ passes vertically through the sockets 60 and ball means 61 (FIGURE 8) and lies substantially in the vertical plane of the frame 53. Another axis $c$ (FIGURE 8) passes horizontally through the socket and ball means and lies substantially in a horizontal plane at that elevation paralleling the horizontal plane of the upper beam 54.

This complex pivoting action of the frame 53 is facilitated by the rollers 62 and tracks 63 which are able to accommodate the pivoting in either a clockwise or counterclockwise direction. Since the bridge member B has a fixed length, the ultimate position of the leg member $L_2$ can be a canted position relative to the vertical as illustrated in phantom in FIGURE 4.

The bridge member is now approximately in the position of FIGURE 3. When the cargo is deposited on the ground, it is acutely angularly disposed with respect to the length of the freight car as shown at 70 instead of being in substantial parallelism as indicated at 71 in the right hand portion of FIGURE 1. This acute angle can be at least 10° and may be as high as 15°. In any event, a tractor cab is now free to back up directly to an angularly positioned truck body with ease, couple the cab to the body, and at once drive away. To load a railroad flat car with a truck body, the procedure as described is merely reversed.

While the foregoing describes a presently preferred embodiment, it is understood that the invention may be practiced in still other forms within the spirit and scope of the following claims.

What is claimed is:

1. A gantry crane comprising first and second spaced legs and an interconnecting bridge member, the first of said legs being connected at its upper end to said bridge member, said first leg having first pivot means thereon permitting rotation of said bridge member about a longitudinal axis of said first leg, the second of said legs being pivotally connected at its upper end to said bridge member for relative rotation about a longitudinal axis of the second leg, said pivotal connection between said bridge and said second leg including second pivot means and stabilizing means, said stabilizing means comprising a pair of upwardly facing anti-friction members secured to the upper end of said second leg on opposite sides of said second pivot means, and cooperating bearing members secured to said bridge member and being of sufficient lateral extent to engage said anti-friction members during relative rotation of said bridge member and said second leg through an arc of at least 10° in either direction from a normal position, the lower end of at least one of said legs being mounted for linear movement relative to the other of said legs.

2. The gantry crane of claim 1 wherein said lower ends of the leg members are adapted to move on tracks, the lower end of said first leg member being supported upon at least dual tracks.

3. The gantry crane of claim 1 wherein said leg members include power means to move said leg members linearly and relatively as defined.

4. The gantry crane of claim 1 wherein said pivot means on said second leg comprises a partial ball and socket connection.

5. The gantry crane of claim 1 wherein said anti-friction members comprise rollers.

6. The gantry crane of claim 1 wherein said bearing members are tracks.

7. The gantry crane of claim 1 wherein said anti-friction members comprise cylindrical rollers and said bearing means comprises rails.

8. The gantry crane of claim 1 wherein the lower end of at least one of said leg members is adapted to move on tracks.

9. The gantry crane of claim 1 wherein said bridge member is of a fixed length between said legs, said first leg is rigidly fixed to said bridge member at its upper end, said first pivot means is disposed adjacent the lower end of said first leg, and said second pivot means permits relative pivotal movement of said bridge member and second leg about a plurality of axes, said second pivot means being located in a vertical plane containing a longitudinal centerline of the bridge member and the longitudinal axis of said second leg and permitting oscillatory movement about a horizontal axis normal to said plane and also about the longitudinal axis of said second leg.

10. The gantry crane of claim 9 wherein said first pivot means on said first leg includes a carrier means, pivotal means on said carrier means, arcuate tracks on the carrier generally concentric with the pivotal means, and tapered bearing means rotatably mounted on said lower end and engaging said tracks to facilitate the rotation of said first leg member.

11. An improved gantry crane for the loading and unloading of cargoes from a plurality of in-line carriers placed end-to-end, whereby such cargoes may be picked-up or deposited at locations laterally offset from said in-line carriers and in an acute angular position relative to the carriers; said crane comprising generally an inverted U-shape construction including two leg members and an interconnecting bridge member of fixed length, said bridge member being adapted to support a lifting frame and the like for engaging said cargoes and being normally disposed horizontally across the carriers substantially at right angles thereto, a first leg member fixed at one end to the bridge member and mounted for rotation at its lower end about the longitudinal vertical axis thereof, a second leg member pivotally mounted at its upper end to the bridge member for rotation about a plurality of axes, a partial ball and socket connection located in a vertical plane containing a longitudinal centerline of the bridge member and the longitudinal axis of the second leg and permitting oscillatory movement about a horizontal axis normal to said plane and also about the longitudinal axis of said second leg, and stabilizing means for said partial ball and socket connection comprising a pair of rollers mounted on the upper end of said second leg member on opposite sides of said vertical plane and a pair of tracks mounted on said bridge member for rolling engagement with said rollers during skewing of the bridge member, and means to move the ends of the leg members relatively to each other in a direction generally paralleling said in-line carriers, whereby the bridge member of fixed length may be swung at least 10° in a horizontal plane to a transverse acute angle of position with respect to the in-line carriers, said first leg member pivoting about its lower end and said second leg member pivoting about its junction with the bridge member while assuming a vertical, canted position to accommodate said swinging of the bridge member.

References Cited by the Examiner

UNITED STATES PATENTS

| 858,314 | 6/1907 | Williamson | 212—15 |
| 3,081,884 | 3/1963 | Minty | 212—14 |

FOREIGN PATENTS

| 1,126,092 | 3/1962 | Germany. |
| 1,128,958 | 5/1962 | Germany. |
| 374,919 | 9/1939 | Italy. |

EVON C. BLUNK, *Primary Examiner.*

SAMUEL F. COLEMAN, *Examiner.*

A. L. LEVINE, *Assistant Examiner.*